(12) United States Patent
Olsen et al.

(10) Patent No.: US 11,940,340 B2
(45) Date of Patent: Mar. 26, 2024

(54) INTEGRATED SENSORS

(71) Applicant: Hutchinson Technology Incorporated, Hutchinson, MN (US)

(72) Inventors: Clark T. Olsen, Dassel, MN (US); Duane M. Jelkin, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 796 days.

(21) Appl. No.: 17/028,706

(22) Filed: Sep. 22, 2020

(65) Prior Publication Data
US 2021/0356338 A1 Nov. 18, 2021

Related U.S. Application Data

(60) Provisional application No. 63/024,455, filed on May 13, 2020.

(51) Int. Cl.
*G01L 1/22* (2006.01)
*G01K 7/16* (2006.01)
*G01L 1/14* (2006.01)

(52) U.S. Cl.
CPC ............ *G01L 1/2206* (2013.01); *G01K 7/16* (2013.01); *G01L 1/14* (2013.01)

(58) Field of Classification Search
CPC ....... G01L 1/2206; G01L 1/14; G01L 19/147; G01K 7/16
USPC ......................................................... 177/211
See application file for complete search history.

(56) References Cited

U.S. PATENT DOCUMENTS

| 3,745,502 | A | 7/1973 | Watanabe et al. | |
| 7,341,330 | B2* | 3/2008 | Silverbrook | B41J 2/155 347/40 |
| 8,205,653 | B2* | 6/2012 | Kim | G02F 1/1303 156/581 |
| 8,999,446 | B2* | 4/2015 | Yu | C03C 15/00 216/97 |
| 9,738,056 | B2* | 8/2017 | Joshi | H01L 23/3733 |
| 10,705,013 | B2* | 7/2020 | Weeks | G01N 3/04 |
| 10,883,047 | B2* | 1/2021 | Manabe | C09K 19/3444 |
| 11,264,261 | B2* | 3/2022 | Sun | C09J 183/04 |
| 11,458,690 | B2* | 10/2022 | Schneider | A61F 13/4963 |
| 11,638,353 | B2* | 4/2023 | Davis | H05K 1/181 361/760 |
| 11,661,535 | B2* | 5/2023 | Scheffel | C09J 11/06 428/212 |
| 11,680,183 | B2* | 6/2023 | Shen | C09D 133/08 524/377 |
| 2008/0196508 | A1 | 8/2008 | Confield et al. | |
| 2008/0203137 | A1* | 8/2008 | La Tulipe | B23K 31/12 228/103 |

(Continued)

OTHER PUBLICATIONS

International Preliminary Report on Patentability in International Application No. PCT/US2021/031730, dated Nov. 24, 2022.

(Continued)

*Primary Examiner* — Jacques M Saint Surin
(74) *Attorney, Agent, or Firm* — DLA Piper LLP (US)

(57) ABSTRACT

An apparatus is described. The apparatus may include a substrate and one or more sensors mounted to the substrate. The one or more sensors may be mounted to the substrate using adhesive material and one or more spot welds.

15 Claims, 4 Drawing Sheets

(56) References Cited

U.S. PATENT DOCUMENTS

2018/0358327 A1    12/2018  Fathi et al.
2020/0092998 A1     3/2020  Davis et al.
2022/0127137 A1*  4/2022  Pahl ..................... B81B 3/0067

OTHER PUBLICATIONS

International Search Report and Written Opinion in International Application No. PCT/US2021/031730, dated Aug. 16, 2021.
Geokon, Inc., "Instruction Manual, Model VK-4100/4150, Vibrating Wire Strain Gages", pp. 1-36, 2015.

* cited by examiner

500

```
┌─────────────────────────────┐
│ MOUNTING ONE OR MORE        │
│ SENSORS ON A SUBSTRATE      │
│ USING ADHESIVE BONDING      │
│ MATERIAL AND ONE OR MORE    │
│ SPOT WELDS                  │
│                         502 │
└─────────────────────────────┘
               │
               ▼
┌─────────────────────────────┐
│ FORMING ONE OR MORE         │
│ ELECTRICAL CIRCUITS ON      │
│ THE SUBSTRATE               │
│                         504 │
└─────────────────────────────┘
```

FIG. 5

INTEGRATED SENSORS

CROSS-REFERENCE TO RELATED APPLICATIONS

This application claims priority from U.S. Provisional Patent Application No. 63/024,455, filed on May 13, 2020, which is hereby incorporated by reference in its entirety.

FIELD

Embodiments of the disclosure relate to integrating sensors into an electronic device. Embodiments of the disclosure also relate to methods of assembling the sensors into the electronic device.

BACKGROUND

Pressure and force sensors (e.g., capacitive-type and strain gauge-type) are known and used in a wide range of applications. There remains, however, a continuing need for an improved integration of pressure and force sensors within an electronic device. Advantageous features of such improved integration can include the ability to use manufacturing processes that enable the efficient and high-volume manufacture of the sensors, robust design space capabilities enabling sensors operable over a wide range of pressures and forces, thermal and moisture stability, small size and suitability to a range of applications.

SUMMARY

An apparatus is described. The apparatus may include a substrate and one or more sensors mounted to the substrate. The one or more sensors may be mounted to the substrate using adhesive material and one or more spot welds.

In some embodiments, the apparatus may also include one or more electrical circuits formed on the substrate electrically coupled with at least one of the one or more sensor components formed on the substrate. The one or more sensors may be a resistance temperature detector. Alternatively, one of the one or more sensors may include an array of resistance temperature detectors.

In some embodiments, at least one of the one or more sensors is a pressure sensor. The pressure sensor may be a strain gauge. Alternatively, the pressure sensor may be a capacitive sensor. In some embodiments, the one or more sensors may be mounted to the substrate by welding the one or more sensors to the substrate and subsequently wicking the adhesive material between the one or more sensors and the substrate. In alternative embodiments, the one or more sensors may be mounted to an adhesive bonding material area on the substrate and the one or more sensors is subsequently welded to the substrate.

The apparatus may include any one of an internet of things device, a medical device, a smart sensor, a home automation device, an industrial sensor, an automotive sensor, environmental device, security device, a public safety device, a retail device, a logistics device, and a consumer device.

A method is also described. The method may include mounting one or more sensors on a substrate using adhesive material and one or more spot welds. The method may also include forming one or more electrical circuits on the substrate.

In some embodiments of the method, mounting the one or more sensors on a substrate includes welding the one or more sensors to the substrate and subsequently wicking the adhesive material between the one or more sensors and the substrate. Alternatively, mounting the one or more sensors on a substrate includes mounting the one or more sensors to an adhesive material area on the substrate and subsequently welding the one or more sensors to the substrate.

Other features and advantages of embodiments of the present disclosure will be apparent from the accompanying drawings and from the detailed description that follows.

BRIEF DESCRIPTION OF THE DRAWINGS

Embodiments of the present disclosure are illustrated by way of example and not limitation in the figures of the accompanying drawings, in which like references indicate similar elements and in which:

FIG. 5 is a flowchart illustrating an example process for mounting one or more sensors on a substrate using adhesive material and one or more spot welds.

DETAILED DESCRIPTION

An apparatus is described. The apparatus may include a substrate and one or more sensors mounted to the substrate. The one or more sensors may be mounted to the substrate using adhesive material and one or more spot welds.

Figure 1:
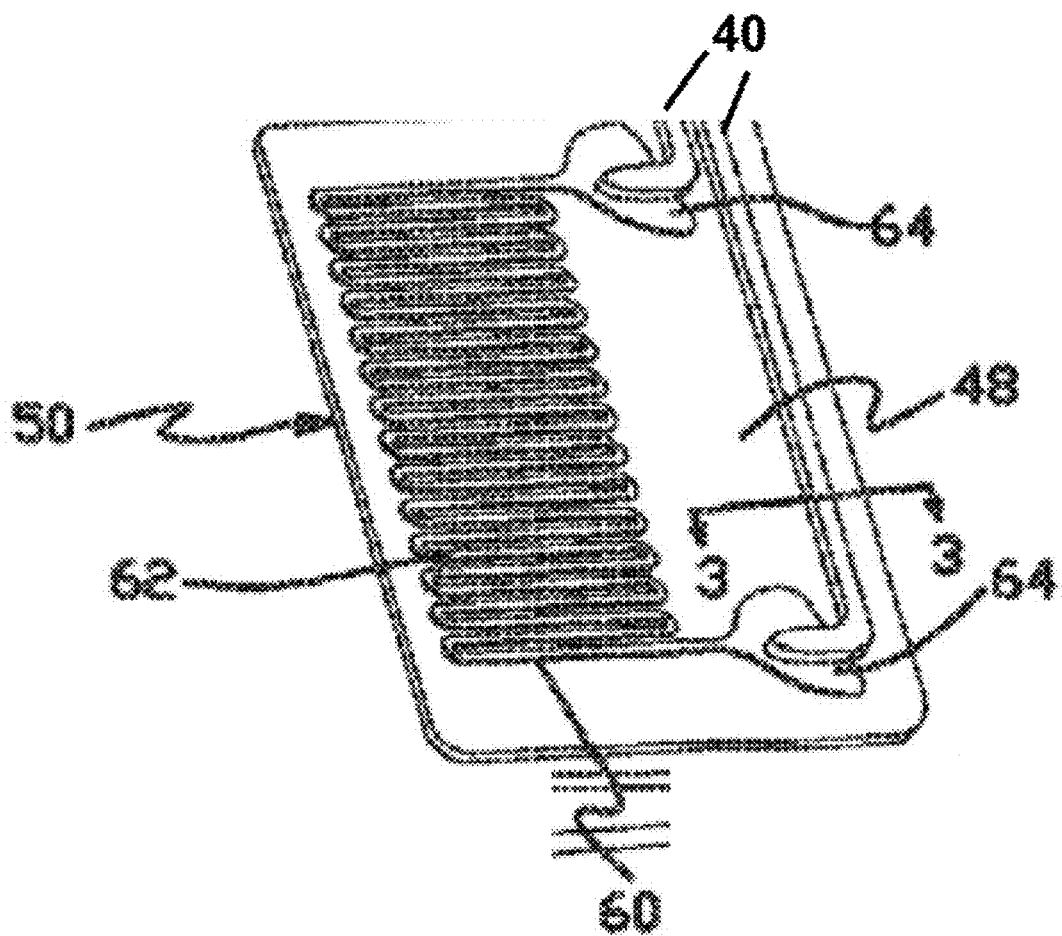
FIG. 1 illustrates a strain gauge, in accordance with various embodiments, disposed on a device.

FIG. 1 illustrates a strain gauge on a device 10, in accordance with various embodiments. The device 10 includes a sensor 50 mounted on a substrate 48 and configured to provide pressure detection of one or more sections within a device. The sensor 50 includes a strain gauge element 60. The substrate includes a spring metal layer 13. The strain gauge element 60 can be disposed directly on a first side of the substrate 48.

The strain gauge element 60 is disposed onto the substrate 48 using one of the following: resistance welding, laser welding, adhesive bonding, brazing, soldering, or other joining techniques. Adhesive bonding typically requires an adhesive with high modulus of elasticity to best transfer strain from the spring metal layer 13 to the strain gauge element 60. With respect to welding, explicit weld patterns are typically required to reduce stress effects from attachment, prevent buckling, and transfer strain from the spring metal layer 13 to the strain gauge element 60. The present disclosure is directed towards embodiments of implementing both welding and adhesive bonding to attach the strain gauge element 60 directly on a first side of the substrate 48.

The sensor 50 includes a strain gauge element 60 with a series of linear portions 62 and sensor bond pads 64. The series of linear portions 62 is arranged such that they are connected at their opposite ends to form a zigzag or serpentine pattern. The linear portions 62 may double back to extend parallel with each other. Other patterns can be implemented herein. The strain gauge element 60 can be made up of a long, thin conductive strip of metal suitable for measuring strain by changing in resistance in a stable and predictable manner. The strain gauge element 60 can, for example, be a thin film metal element. Stress that stretches or compacts the sensor 50 changes a dimension (e.g., cross sectional area) of the strain gauge element 60, which changes the electrical resistance across the strain gauge element 60.

Ends of the strain gauge element 60 terminate at the sensor bond pads 64. Traces 40 extend from the sensor bond pads 64 to connect to a measurement circuit for detecting strain based on the measured resistance. The resistance measured across the bond pads 64 will be sensitive to strain in the sensor 50 or other element on which the strain gauge element 60 is integrated. The repeated pattern of the linear portions 62 of the strain gauge element 60 allows for a multiplicatively larger change in resistance.

The strain gauge element 60 can be formed from a relatively high resistance metal, such as an alloy. Such high resistance metals can include, for example, constantan, which is a copper-nickel alloy. The strain gauge element 60 can be formed from any of a strain gauge alloy class of metals. In other embodiments, the strain gauge element 60 can be formed from other suitable metals. In some cases, the strain gauge element 60 can be formed from conductive epoxy or a non-metal conductive material. In some embodiments, the strain gauge element 60 can be formed from more than one layer of material. For example, the sensor 50 can be formed from several layers of conductive material, including a corrosion resistant outer layer disposed on top of the strain gauge element 60. A protective insulating layer or other polymer outer layer can also be provided over the strain gauge element 60. The additional layer on the strain gauge element 60 can be a metal layer. Specifically, a layer of chrome can be disposed over the strain gauge element 60.

Figure 2:
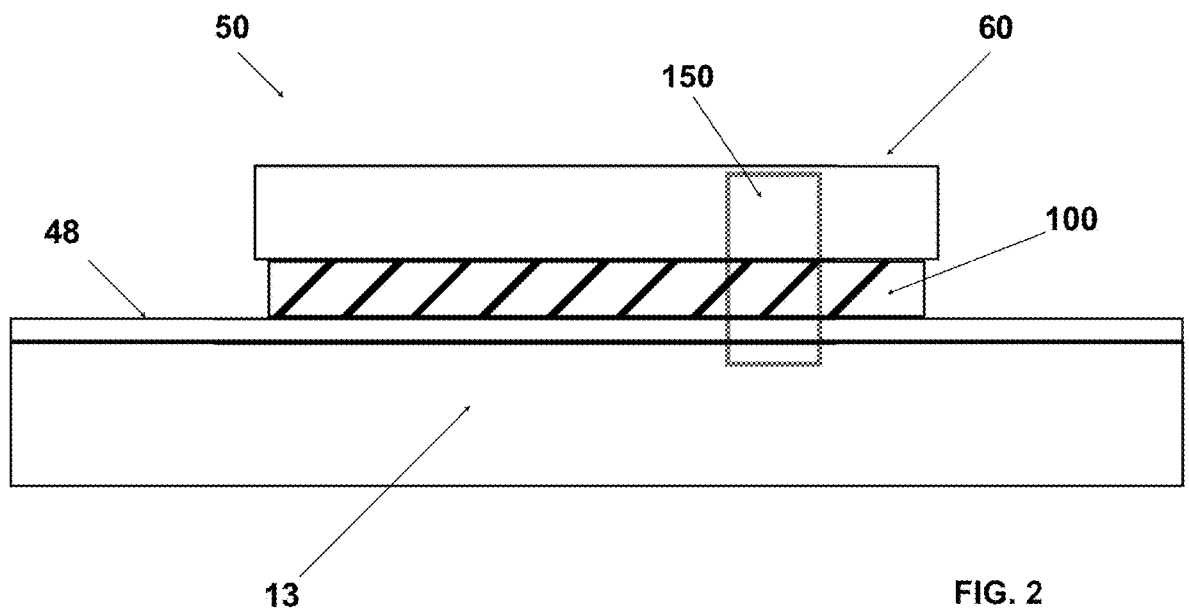
FIG. 2 is a sectional view of a portion of the flexure taken along lines 3-3 in FIG. 1, in accordance with various embodiments of the disclosure.

FIG. 2 is a sectional view of a portion of the sensor 50 shown in FIG. 1, taken along lines 3-3 in FIG. 1. The substrate 48 is illustrated as a top layer of the metal layer 13. The strain gauge element 60 can be adjoined to the first side of the substrate 48 using various manufacturing processes. For example, the strain gauge element 60 can be adjoined to the first side of the substrate 48 by a combination of a weld spot 150 and adhesive material 100. The weld spot 150 can be formed using a welding apparatus, which typically includes a source of energy (e.g., gas, electrical energy, or laser generated coherent energy). The welding apparatus is operable to weld the strain gauge element 60 and the substrate 48 together at the weld spot 150. In some embodiments, the weld spot 150 welds together a portion of the metal layer 13. The weld spot 150 defines a local melt pool between the strain gauge element 60 and the substrate 48 during welding and develops a weld joint when it solidifies.

In some embodiments, the adhesive material 100 may be wicked under the strain gauge element 60 after the strain gauge element 60 is welded at the weld spot 150 to the substrate 48. Alternatively, the strain gauge element 60 can be directly applied to the adhesive material 100 disposed on the substrate 48 in the absence of the weld spot 150. The weld spot 150 may be made after the strain gauge element 60 is adjoined to the adhesive material 100. A single weld spot 150 is illustrated for simplicity; however, it is understood that multiple weld points are implemented to mate the components.

Figure 3:
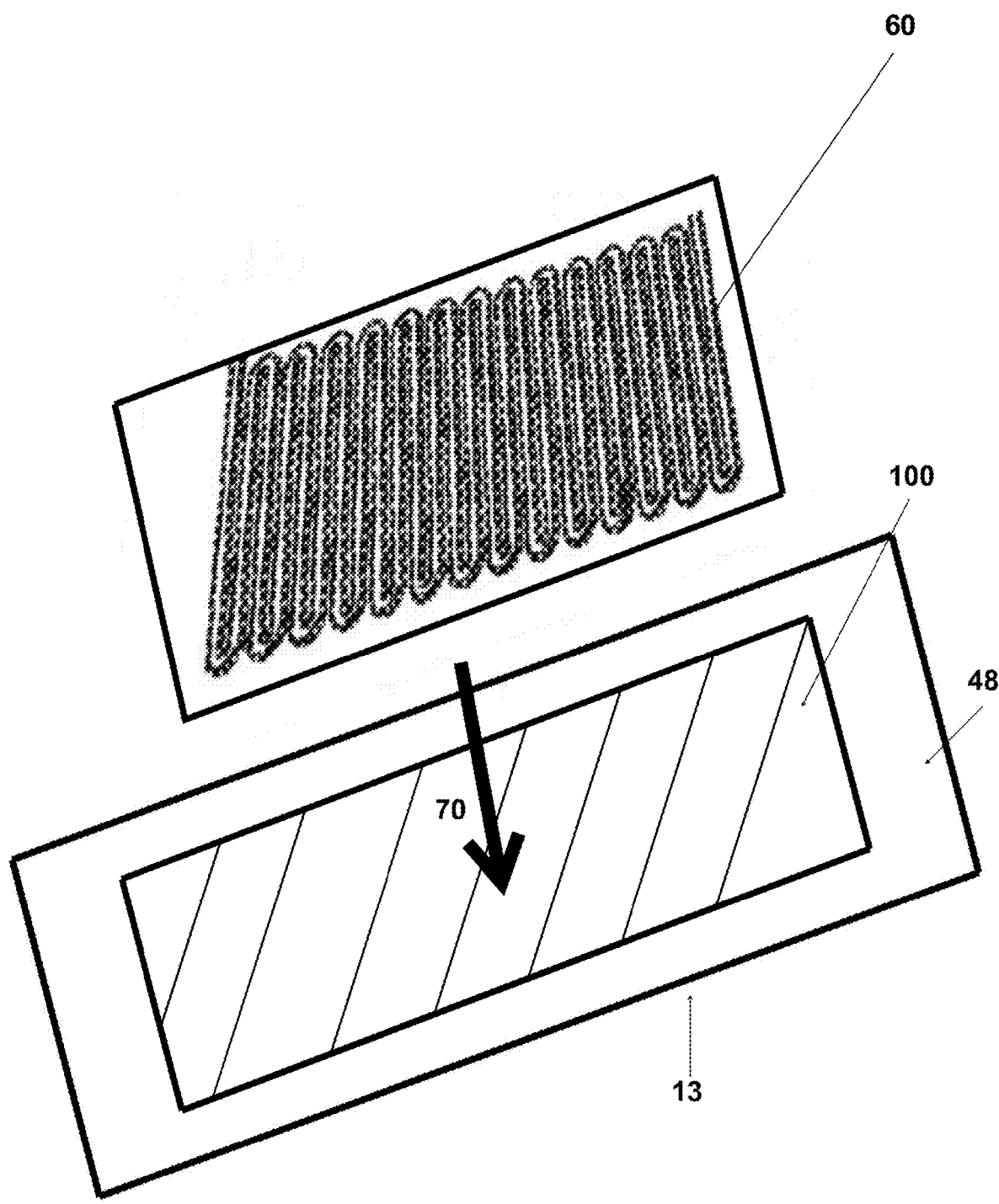
FIG. 3 illustrates a strain gauge element being adjoined to an substrate and a spring metal layer by adhesive material in accordance with various embodiments of the disclosure.
Figure 4:
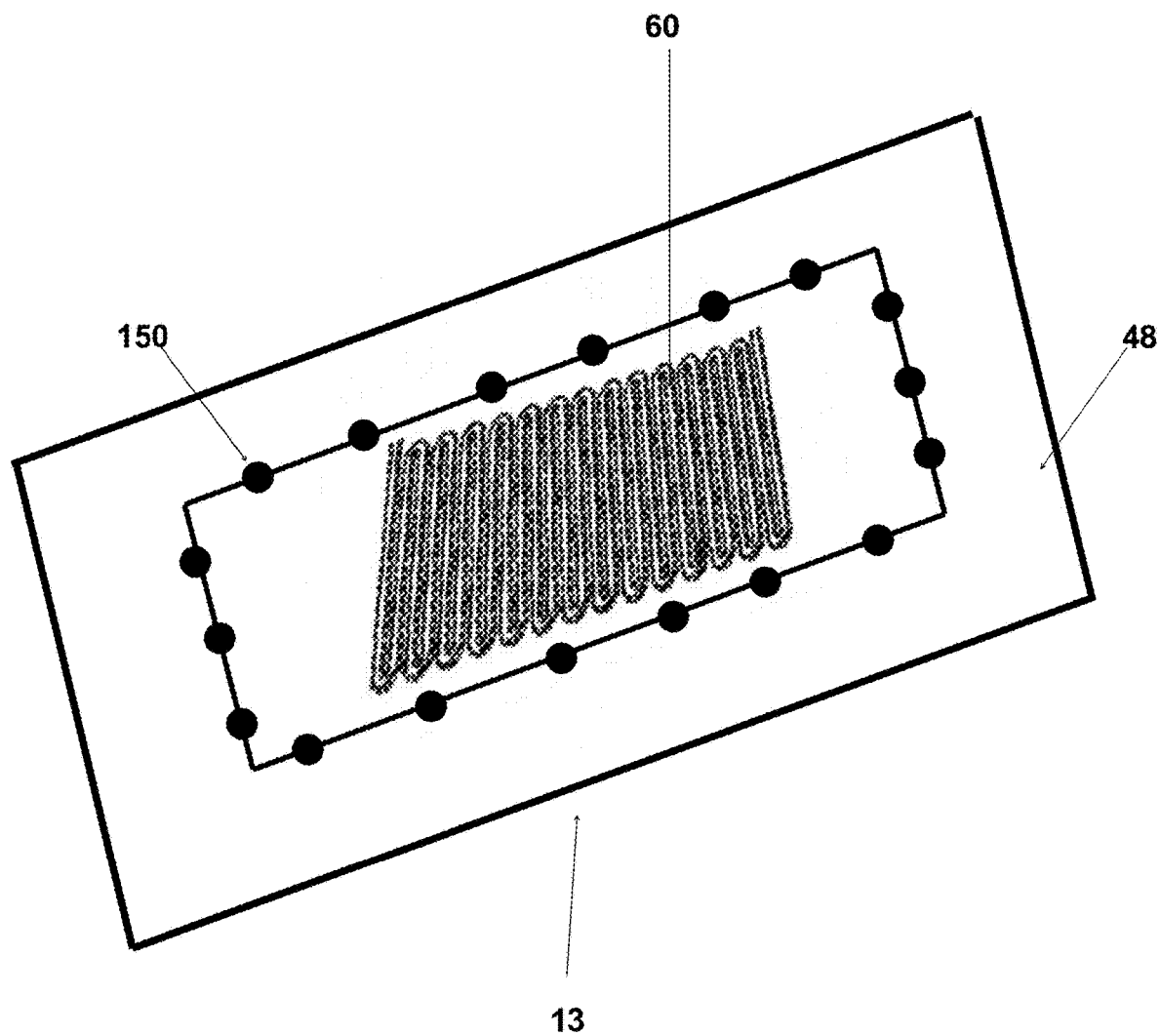
FIG. 4 illustrates the strain gauge element being adjoined to the substrate and the spring metal layer by welds.

FIG. 3 illustrates the strain gauge element 60 being adjoined to the first side of a substrate 48 by an adhesive material 100. An adhesive bonding material area may be disposed on the first side of the substrate 48. The substrate includes, but is not limited to, stainless steel, copper, a polymer film, ceramic, glass, semiconductor, nitinol, and other materials. The strain gauge element 60 may be applied in direction 70 to the adhesive material 100. FIG. 4 illustrates the strain gauge element 60 adjoined to the first side of the substrate 48 and the spring metal layer 13 by weld spots 150. Weld spots 150 may be made after the strain gauge element 60 is adjoined to the adhesive material 100 area on the substrate 48.

Implementing both bonding processes provides benefits resulting from the combination of both welding and adhesive bonding. For example, the weld spot 150 provides a positive metal to metal junction between the substrate 48 and the strain gauge element 60. Weld spot 150 also results in reduced peel-off of metallic material between the substrate 48 and the strain gauge element 60. By combining welding with adhesive material 100, the number of weld spots 150 may be reduced. The reduced weld spots 150 result in an increased area on the strain gauge element 60 for sensor lines. The increased area for sensor lines allows for more sensitivity per area, improving the accuracy of the sensor 50.

The reduced weld spots 150 may also reduce stress imparted to the strain gauge element 60 during assembly. Weld spot 150 enables an efficient and accurate bonding process. The strain gauge element 60 can be precisely placed to allow for repeatability in measurements and minimal position and part-to-part variation. The adhesive material 100 enables the mating of the strain gauge element 60 to the substrate 48 without fixturing.

The adhesive 100 underfill prevents moisture and particles from forming between the strain gauge element 60 and the substrate 48. The combination of weld spots 150 and adhesive 100 bonding improves corrosion resistance and cleanliness. This is particularly advantageous, for example, in medical applications. Moreover, adhesive 100 bonding prevents buckling due to the minimal weld spots 150. The combination of welding and adhesive bonding also enables electrical conductivity through weld spots 150, and thermal conduction through the weld spots 150 and the adhesive 100.

FIG. 5 is a flowchart illustrating an example process 500 for mounting one or more sensors on a substrate using adhesive material and one or more spot welds. At 502, one or more sensors may be mounted on a substrate using adhesive material and one or more spot welds. For example, the one or more sensors may be welded to the substrate. Adhesive bonding material may be subsequently wicked between the one or more sensors and the substrate. Alternatively, the one or more sensors may be adhered to an adhesive bonding material area on the substrate. The one or more sensors may be subsequently welded to the substrate. At 504, the one or more electrical circuits may be formed on the substrate.

The sensors may include, for example, a resistance temperature detector (RTD) (e.g., formed from Nickel, Nickel-Chromium and/or platinum), thermocouple, a capacitive sensor, a thermopile, a thermistor, heater (e.g., formed from Ni-Chrome), reference electrodes (e.g., formed from Silver/Silver-Chloride), electrical sensors/stimulators (e.g., formed from gold or platinum electrodes) such as for an electrocardiography (EKG) or medical electromapping patch. With respect to temperature detectors, the combination of welding and adhesive bonding enables improved thermal conductivity into the detector's gauge.

The disclosed embodiments may also be implemented in mating components that include non-flat surfaces. In some embodiments, weld and solder may be implemented to adjoin a sensor device within an electronic device. In some embodiments, weld and overmold may be implemented to mount a sensor within an electronic device. For example, overmolding may be implemented to add a layer of thermoplastic elastomer (TPE), plastic, or silicon over a formed metal or plastic substrate to join rigid plastics and metals without the aid of the adhesive material. In some embodiments, the welds may include stress relief features to eliminate weld induced stress. The underfill adhesive may attach the gauge functionally to the structure to be tested.

The electronic device may include an internet of things device, a medical device, a smart sensor, a home automation device, an industrial sensor, an automotive sensor, environmental device, security device, a public safety device, a retail device, a logistics device, and a consumer device.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. An apparatus comprising:
   a substrate; and
   one or more sensors mounted to the substrate, the one or more sensors is mounted to the substrate using adhesive material and one or more spot welds, wherein the one or more sensors include:
      a sensor element, wherein one or more ends of the sensor element terminate at sensor bond pads; and
      a series of linear portions each connected at opposite ends and extend in parallel with one another.

2. The apparatus of claim 1, further comprising one or more electrical circuits formed on the substrate electrically coupled with at least one of the one or more sensor components formed on the substrate.

3. The apparatus of claim 1, wherein at least one of the one or more sensors is a resistance temperature detector.

4. The apparatus of claim 1, wherein at least one of the one or more sensors includes an array of resistance temperature detectors.

5. The apparatus of claim 1, wherein at least one of the one or more sensors is a pressure sensor.

6. The apparatus of claim 5, wherein the pressure sensor is a strain sensor.

7. The apparatus of claim 5, wherein the pressure sensor is a strain gauge.

8. The apparatus of claim 5, wherein the pressure sensor is a capacitive sensor.

9. The apparatus of claim 1, wherein the one or more sensors is mounted to the substrate by welding the one or more sensors to the substrate and subsequently wicking the adhesive material between the one or more sensors and the substrate.

10. The apparatus of claim 1, wherein the one or more sensors is mounted to an adhesive material on the substrate and the one or more sensors is subsequently welded to the substrate.

11. The apparatus of claim 1 includes any one of an internet of things device, a medical device, a smart sensor, a home automation device, an industrial sensor, an automotive sensor, environmental device, security device, a public safety device, a retail device, a logistics device, and a consumer device.

12. A method comprising:
   mounting one or more sensors on a substrate using adhesive material and one or more spot welds, wherein the one or more sensors include:
      a sensor element, wherein one or more ends of the sensor element terminate at sensor bond pads; and
      a series of linear portions each connected at opposite ends and extend in parallel with one another.

13. The method of claim 12, further comprising forming one or more electrical circuits on the substrate.

14. The method of claim 12, wherein mounting the one or more sensors on a substrate includes welding the one or more sensors to the substrate and subsequently wicking the adhesive material between the one or more sensors and the substrate.

15. The method of claim 12, wherein mounting the one or more sensors on a substrate includes mounting the one or more sensors to the adhesive material on the substrate and subsequently welding the one or more sensors to the substrate.

* * * * *